United States Patent [19]
Hubbell et al.

[11] 3,752,295
[45] Aug. 14, 1973

[54] INDEXING FEEDER FOR PACKAGE HANDLING MACHINE

[75] Inventors: Roger K. Hubbell, Plymouth, Mass.; Eugene M. Noel, 42 Kingston Rd., Newton Highland, Mass. 02161

[73] Assignee: said Noll, by said Hubbell

[22] Filed: Mar. 12, 1971

[21] Appl. No.: 123,907

Related U.S. Application Data
[63] Continuation of Ser. No. 782,525, Dec. 10, 1968, abandoned.

[52] U.S. Cl. .................................................. 198/34
[51] Int. Cl. ........................................... B65g 47/29
[58] Field of Search ..................................... 198/34

[56] References Cited
UNITED STATES PATENTS

| | | | |
|---|---|---|---|
| 3,217,859 | 11/1965 | Bartlo et al. | 198/34 |
| 2,761,545 | 9/1956 | Hoagland | 198/34 |
| 2,840,223 | 6/1958 | Schoppee | 198/34 |
| 3,155,222 | 11/1964 | Stremke | 198/34 |
| 2,980,222 | 4/1961 | Crosby | 193/35 |
| 2,675,119 | 4/1954 | Birch | 198/34 |
| 1,588,821 | 6/1926 | Stebler et al. | 198/34 X |

FOREIGN PATENTS OR APPLICATIONS

| | | | |
|---|---|---|---|
| 1,034,055 | 6/1966 | England | 198/34 |

Primary Examiner—Evon C. Blunk
Assistant Examiner—W. Scott Carson
Attorney—Charles W. Rummler et al.

[57] ABSTRACT

The disclosure describes a package handling device including escapement mechanism to transform incoming random or intermittent product feed into uniformly timed and spaced discharge. In one embodiment, the device includes switch means on the inlet conveyor to detect product input to the machine and an escapement mechanism comprising a barrier carriage adapted to be raised to prevent passage of product and a release means adapted to be lowered from the path of product to time its release from the escapement, latch means to hold the barrier carriage in raised position in response to the switch means to allow the build-up of product on the inlet conveyor and means to delay the disengaging of the latch means sufficient to allow a predetermined product build-up behind the barrier carriage which is necessary for uninterrupted product discharge from the machine in timed and spaced relationship according to the infeed requirement of the subsequent processing machine. Other embodiments are disclosed.

7 Claims, 19 Drawing Figures

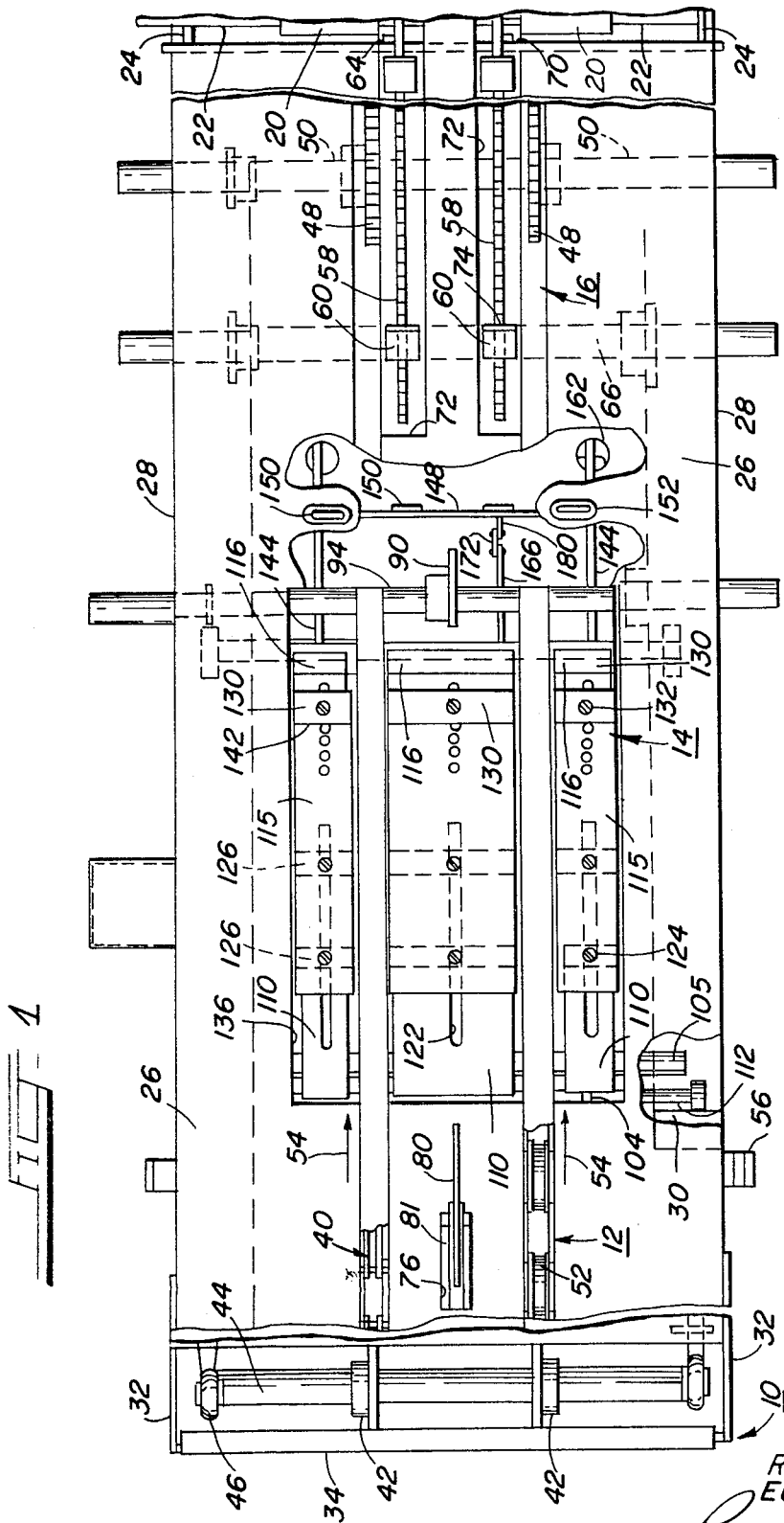

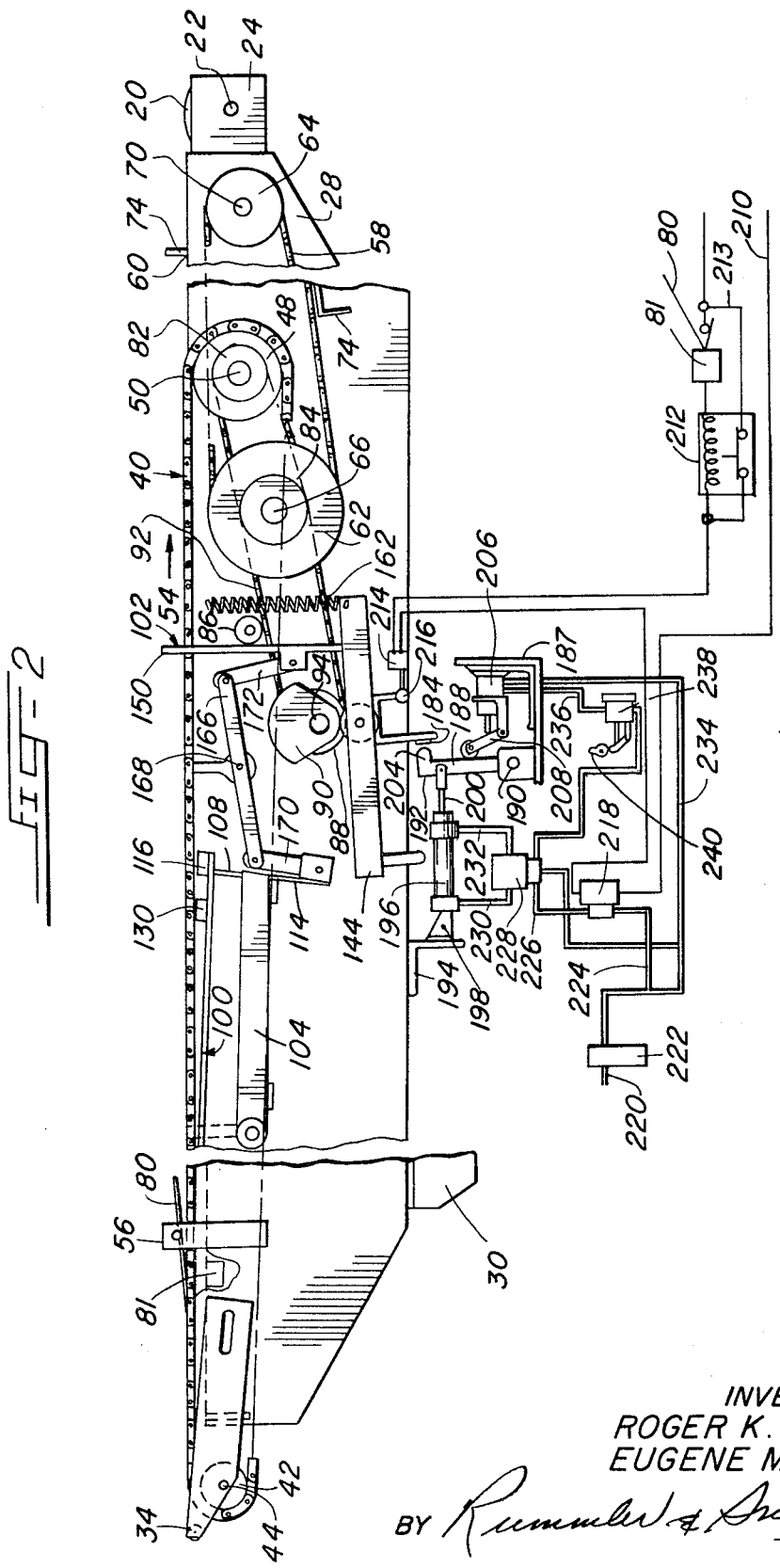

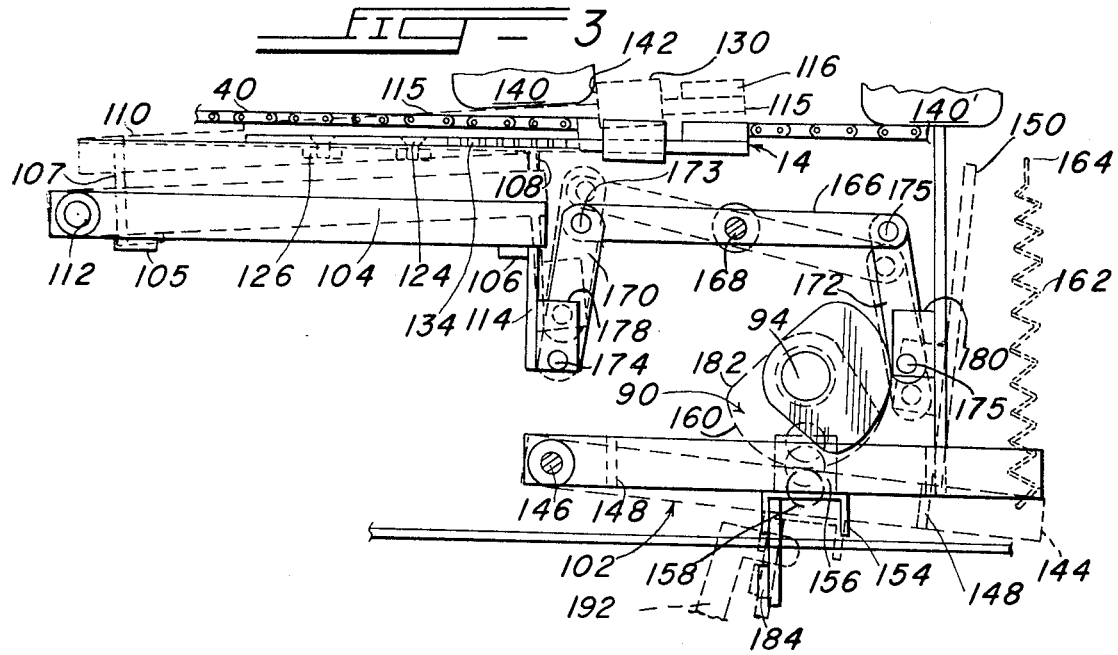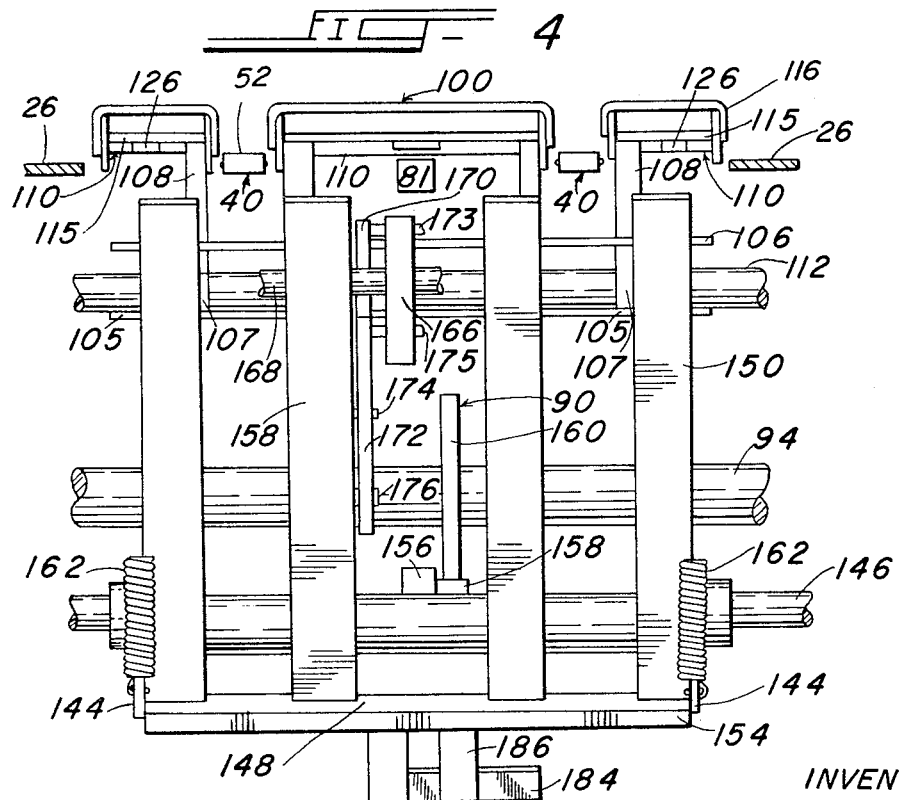

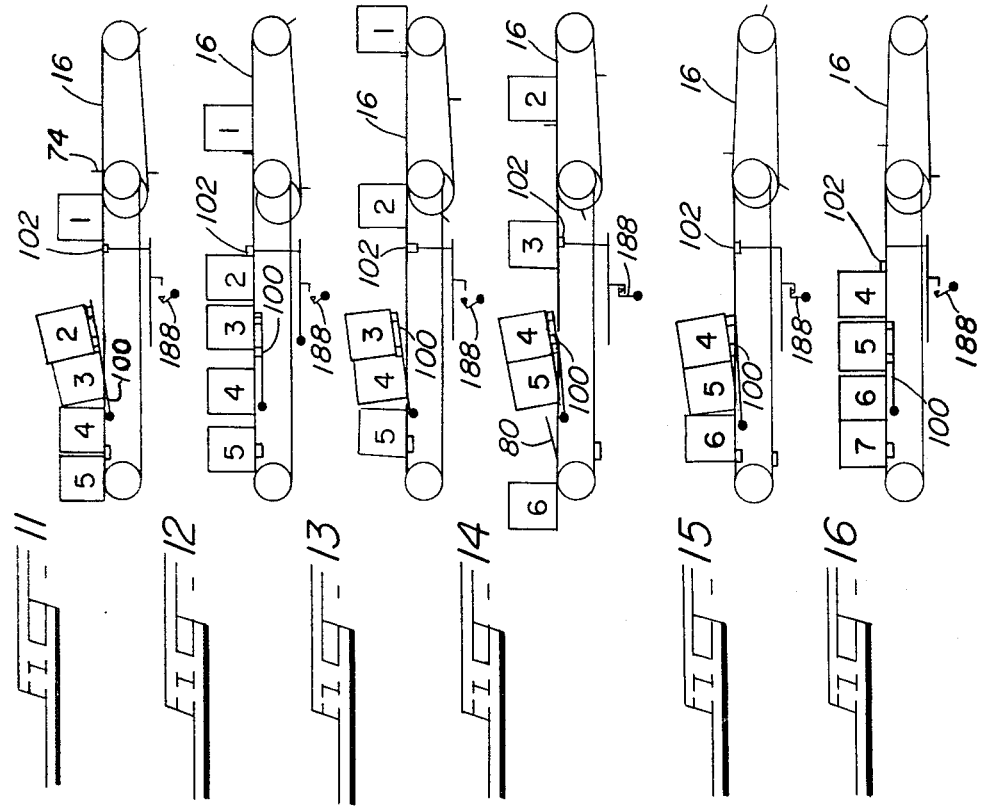
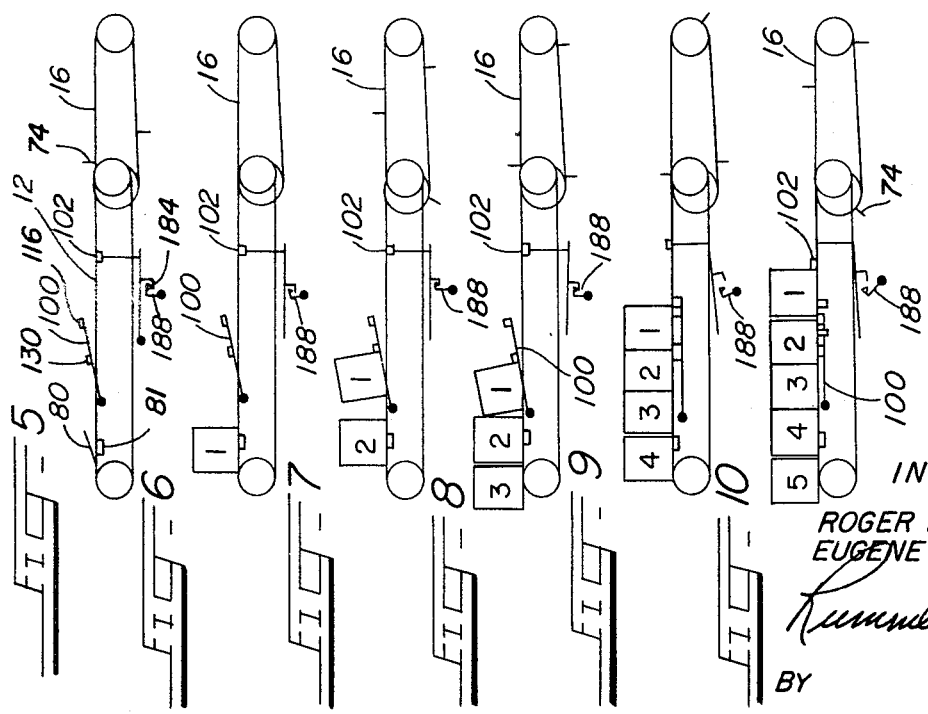
INVENTORS.
ROGER K. HUBBELL
EUGENE M. NOEL
BY

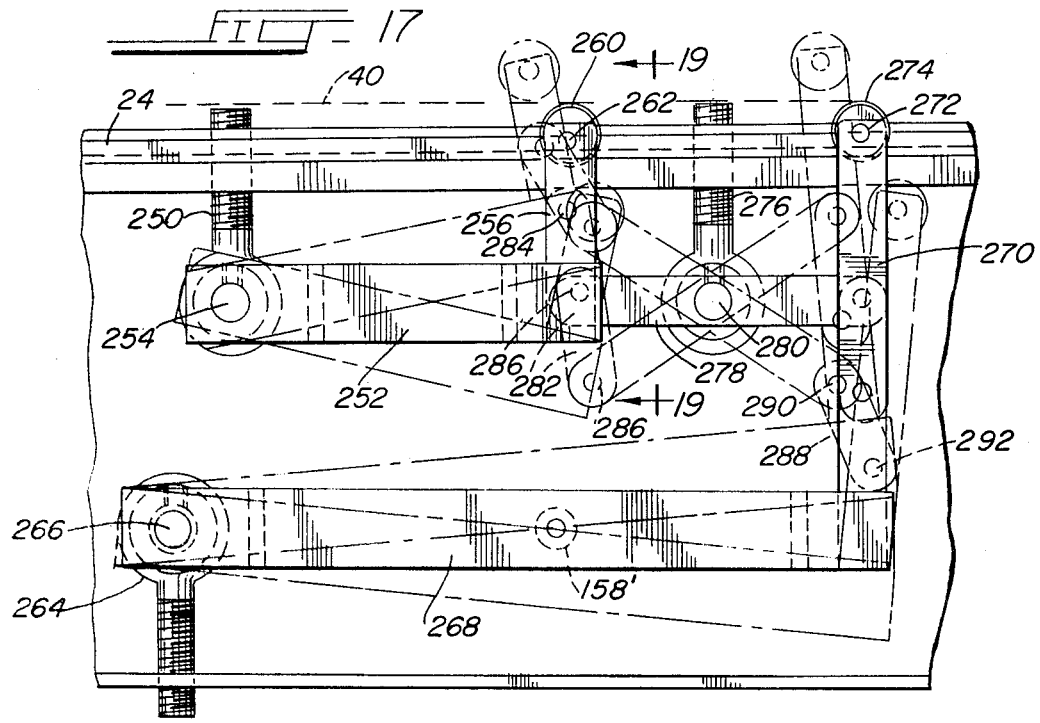
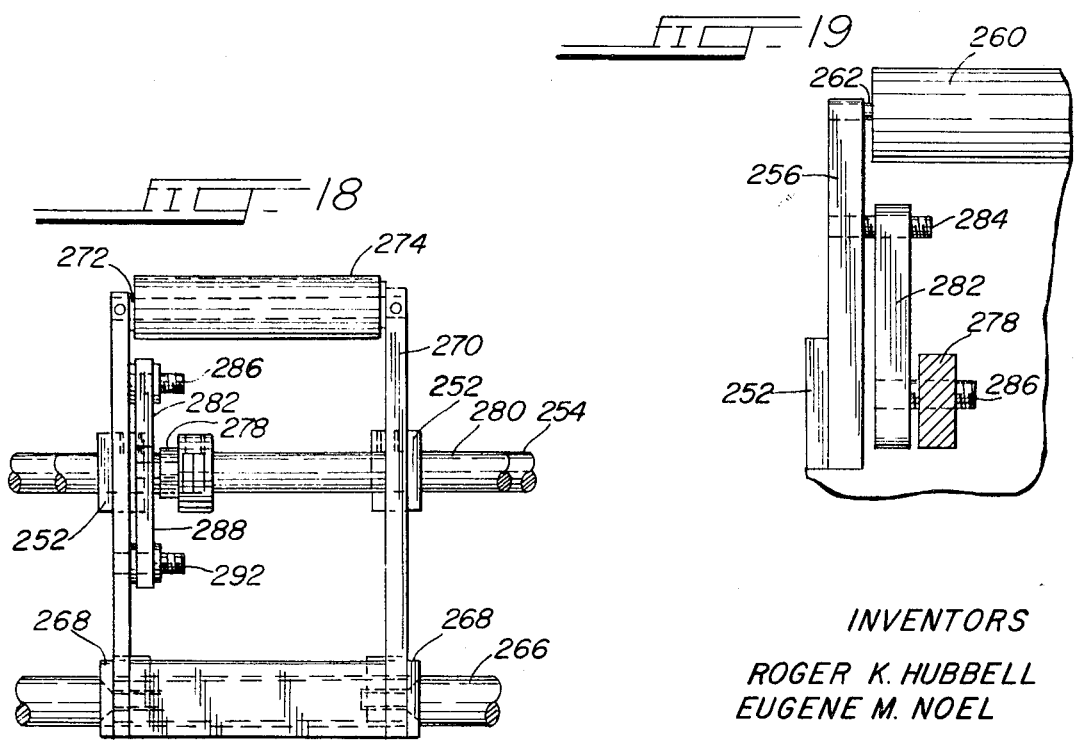
INVENTORS
ROGER K. HUBBELL
EUGENE M. NOEL

INDEXING FEEDER FOR PACKAGE HANDLING MACHINE

BACKGROUND OF THE INVENTION

This application is a continuation of our copending application Ser. No. 782,525 filed Dec. 10, 1968, now abandoned.

Packaging and wrapper machines require a uniform and continuous supply of product to operate effectively and at the highest efficiency. Inclined or vertical conveyors are used to hold a reserve supply of product in a magazine or chute such as in a can labeling machine or a machine adapted to handle cylindrical objects such as carbon rods in the manufacture of the cores for flashlight batteries. A stop member is used to hold up a magazine loaded with product and release one or more of the products at a time according to the input requirements of the subsequent processing machine. Likewise horizontal conveyors build up product potential against a stop above a moving conveyor belt. Frictional contact of the moving belt on the stationary product moves the product in the desired sequence after release. The disadvantage with these devices is that with normal tolerance on size and shape of product to be handled, cut-off of product movement from build-up to product release is so critical in point of space and time that reliability is detrimentally affected; and since there is no precisely definable position between adjacent product units of a statistical group standing back-to-back on the conveyor belt, such machines are unreliable.

In a hand-feed form, dead plates are used to separate adjacent product for controlled timed and spaced infeed to the packaging or wrapping machine. In an automatic form, difficulties are experienced in the adjustment of such devices for handling a wide range of sizes and shapes of product and providing means for coordination of the product handling thereon. Rocker escapements for timing and spacing of product discharge often require product hold-down arms when used with conveyor belts in order to prevent creeping and misalignment of the product on the conveyor during hold back or stop periods. The device of this invention also eliminates the necessity of using photo cells and similar devices to actuate hold and release mechanisms, with attendant adjustment and sensitivity problems. Such automatic timing and spacing devices generally continue to operate whether or not product is being supplied and are either dependent on a constant supply of product or do not provide even or continuous discharge, especially where the output of one or more machines or piece workers is being fed to a continuously operating machine such as a bagger or packaging machine.

SUMMARY OF THE INVENTION

This invention concerns a timing and spacing mechanism for product being conveyed to the input of a processing machine, which mechanism is adapted to receive the product from a random or mixed source of supply at a rate less than the input rate required by the processing machine, momentarily delay the movement of the product while establishing a predetermined build-up on the conveyor, and to release the articles in a predetermined, timed and spaced discharge in coordination with the input requirements of the processing machine. In one embodiment, the mechanism includes means to detect the presence or absence of a predetermined product on the conveyor inlet, and is adapted to prevent the movement of the product along the conveyor by a combination of product barrier and lifting means, followed by release of said product to a discharge slider bed conveyor in timed and spaced relationship thereon according to the input requirements of a subsequent processing machine. When the build-up of product on the conveyor inlet is insufficient to meet the continuous operating input requirements of the subsequent processing machine, the escapement mechanism is locked out and ceases to discharge product to the processing machine until there is a predetermined build-up of product as permitted by a time delay device in the product build-up control circuit.

DESCRIPTION OF THE DRAWINGS

Illustrative embodiments of this invention are shown in the drawings, in which:

FIG. 1 is a fragmentary top plan view of a conveyor system employing the escapement of this invention as applied to a package wrapping machine;

FIG. 2 is a fragmentary side view with parts cut away to show the oscillating and latch mechanisms of this invention;

FIG. 3 is a fragmentary side view with parts cut away to show the position of the parts of the escapement in a partial release position (full lines) and in a full release position (broken lines);

FIG. 4 is an end view of FIG. 3 with the barrier carriage in stop position and the release carriage in release position;

FIG. 5-16 is a series of diagrammatic views illustrating the flow of product through the escapement mechanism with the parts thereof in the different positions of the cycles of operation;

FIG. 17 is a fragmentary side view of a modification of the instant invention showing roller barrier carriage and roller release carriage elements, same being illustrated in their respective alternating cycles of motion;

FIG. 18 is a fragmentary end view of the embodiment shown in FIG. 17; and

FIG. 19 is a fragmentary cross-sectional view taken along the lines 19—19 of FIG. 17.

THE PREFERRED EMBODIMENTS

Referring to the drawings, particularly FIGS. 1 and 2, there is shown the machine input 10 adapted to receive random product from a source (not shown) and pass the product to the continuous inlet conveyor 12. The escapement mechanism, generally represented at 14, is adapted to pass a continuous supply of uniformly timed and spaced product to a discharge slider bed conveyor and thence to the input of a subsequent processing machine, which, for purposes of illustration, can be the constant speed feed mechanism for an automatic bagging or wrapping machine (not shown). The structure is supported on and within side frame members 24 having a flat, smooth cover plate 26 and side plates 28 carried by suitable leg supports 30. A pair of brackets 32 carry the feed idler roller 34 at the input of the machine to pass the product on to the flights of the continuous inlet conveyor 12.

The inlet conveyor 12 can have any type of endless conveyor of the belt or chain types and is illustrated by a pair of link chains 40 which are carried at the machine input 10 by the sprockets 42 on the shaft 44 between adjusting journals 46 and carried at the discharge end by the sprockets 48 on the shaft 50, suitably journaled between the longitudinal side support members 24. The chains 40 operate in parallel relationship under the top surface of the cover plate 26, so that the top surfaces of the links 52 are carried sufficiently above the cover plate 26 to be in contact with the under surface of product and carry same therealong in the direction of the arrows 54. A number of supports 56 are provided along the sides of the inlet conveyor 12 for the purpose of affixing suitable guide rails (not shown) as desired.

The discharge slider bed 16 can be any suitable means for receiving and conveying the product from the inlet conveyor 12 along the cover plate 26 in timed and spaced relationship to the feed mechanism of a bagging or wrapping machine as previously mentioned. To illustrate, the discharge slider bed 16 takes the form of the pair of discharge conveyor chains 58 having the spaced flights 60 carried between drive sprockets 62 and driven sprocket 64 on the sprocket shafts 66 and 70. The conveyor chains 58 are carried within the elongated slots 72 in and below the cover plate 26 in such a manner that the cleat parts 74 of each flight extend above the plate 26 and pass in such a relationship that the product is pushed therealong to the rollers 20 in equal spaced relationship. Any number of flights 60 can be used, properly spaced to pick up and discharge the product in timed sequence. The transverse spacing between the conveyor link chains 40 of the inlet conveyor 12 and the discharge conveyor chains 58 can be varied and are established so as to be less than the width of length of the product depending on whether the same is fed sidewise or endwise to machine input 10.

The cover plate 26 has a slot 76 through which extends the product switch arm 80 connected to a product switch 81. The switch arm 80 is spring loaded and held at an angle toward the direction of the arrow 54 so as to assume a raised position above the surface of the conveyor link chains 40 until a product passes over the arm or rests thereon, at which time it is pivoted downwardly to actuate product switch 81. The inlet conveyor 12 moves fast enough to carry the widest package through the escapement mechanism. The movement of the spaced flights 60 of the discharge conveyor 16 is timed and spaced with regard to the infeed requirements of the subsequent processing machine. In one embodiment, the discharge sprocket shaft 50 carries the driven sprocket 82 co-axial with the larger sprocket 48 and, in line therewith, the shaft 66 carries the intermediate driven sprocket 84 co-axial with the drive sprocket 62. The idler sprocket 86 is aligned between the sprockets 84 and the driven sprocket 88 carried co-axially with the drive cam 90, the sprockets being engaged by the drive chain 92. The drive shaft 94 is suitably journaled within the frame members 24 and is keyed to or otherwise affixed to both the drive sprocket 88 and the cam 90. The drive chain 92 can be a single chain passing around the sprockets 82 and 88 and engaging the intermediate sprocket 84 therebetween or sprocket 84 can be a double sprocket with a separate chain to connect over the sprocket 82. The arrangement is such that the speed of the conveyor 12 can be changed by changing the sprocket 48, without affecting the timed rotation of the sprocket 62. The foregoing timed relationship is accomplished in any suitable manner such as by driving drive shaft 94 of this invention from the same shaft that drives the machine being fed on a 1:1 basis so that one operating cycle of the indexing device exactly equals one operating cycle of the machine that is driving it. The sprockets 84 and 88 are of equal diameters maintaining a 1:1 speed ratio of drive cam 90 to drive shaft 94.

One form of the escapement mechanism contemplated by this invention is illustrated in FIGS. 1, 2, 3 and 4 to comprise the barrier carriage assembly 100 and the release assembly 102. The barrier carriage assembly 100 has a pair of spaced pivot arms 104 held together transversely by the rear and forward bracket members 105 and 106, with the spaced rear uprights 107 and front uprights 108 supporting the spaced barrier bars 110 therebetween, with the entire assembly pivotally mounted toward the inlet end of the assembly by the shaft 112 carried between the side frame members 24, transverse of the inlet conveyor 12. The brackets 105 and 106 form, by means of the vertical supports 107 and 108, a unitized framework holding the barrier bars 110 in coplanar parallel relationship. One of the front upright members 108 has the downward extension 114. Each barrier has an elongated adjustable U-shaped flat topped bar 115 with a U-bar pad 116 fixed at the end. The U-bars 115 are slidably mounted to allow adjustment of the distance of U-bar pads 116 from release assembly 102 on barrier bars 110, i.e., by means of the elongated slots 122 in the barrier bars 110 to which they are affixed by means of the bolts 124 engaging the cleats 126 on the under sides of the bars 110. Also, the barrier carriage assembly 100 is provided with adjustable pads 130 by means of the screws 132 which engage with any one of a series of spaced threaded bore holes 134 along the forward ends of the U-bars 115. Other means for providing adjustability of the pads 130 can be used.

As illustrated in FIGS. 1 and 2, the barrier carriage assembly 100 has three barrier bars 110 spaced one in the middle and one on the outside of each of the link chains 40 of the inlet conveyor 12, within the opening 136 of the top plate 26, having dimensions slightly less than the length or width of product and with the center bar 110 being wider than the two outer bars. The top surfaces of the pads 116 and 130 are smooth and may bear any desired height relationship with each other or with the top surfaces of the bars 110. Preferably, the pads 116 and 130 are substantially the same height. Also illustrated in FIG. 3 is a package 140, being carried by the link chain conveyor 40 up onto the U-bars 115 and stopped against the shoulder 142 of the pads 130. The package 140 is shown in a cross-wise position on the link chains 40 and the barrier carriage assembly 100 is in the stop position. A second package 140' is in the process of being released by the release assembly 102 at the time package 140 is in the stop position.

The release assembly 102 comprises a pair of spaced support bars 144 pivotally mounted from the shaft 146 (see FIG. 3), suitably supported transversely in the side frame members 24 and tied together by suitable cross member 148 (front and rear) in planar relationship. At the forward end of the spaced support bars 144 a series of transversely spaced upright release bars 150 are affixed, which are adapted to be raised to a position above the cover plate 26 (FIG. 1) through the apertures 152 in cover plate 26 to stop the movement of product on conveyor link chains 40.

The cross member 154 ties the support bars 144 together and carries the mounting 156 for the cam follower 158 in a vertically aligned position with the shaft 94 and in rolling contact with the cam surface 160 of drive cam 90 in the position shown in FIG. 3. Cross member 154 is part of release assembly 102 which is adapted to lower to a position below the cover plate 26 (FIG. 1) through the apertures to release the product onto said discharge slider bed conveyor 16 in the proper time sequence. A pair of tension springs 162 are affixed to the ends of the support bars 144 and extend upwardly to a fixed point 164 on the side frame members 24. The springs 162 thus bias the release assembly 102 with the cam follower 158 to maintain rolling contact with the drive cam 90 at all times.

In escapement mechanism 14 barrier carriage assembly 100 and the release assembly 102 are linked together to oscillate in simultaneous reciprocal cooperation by means of the rocker arm 166, which is centrally mounted on the fixed pivot shaft 168 rotatably supported between the side frame members 24 and pivotally connected to one end of barrier link 170 at pivot pin 173 and to one end of release link 172 at pivot pin 174. Pivot pin 174 at the other end of barrier link 170 is pivotally connected to tab member 178 on downward extension 114 of barrier carriage assembly 100 so as to lift or lower spaced barrier bars to bar the product while pivot pin 175 at the other end of release link 172 is pivotally connected to tab member 180 on upright release bars 150. The links 170 and 172 are substantially the same length. However, the radial length of the barrier carriage assembly 100 from the pivot shaft 112 to the carriage pad 116 is longer than the radial length of the release assembly 102 from the pivot shaft 146 to the upright release bars 150. Also, fixed pivot 168 is approximately half-way between barrier pivot pin 173 and release pivot pin 174. This provides approximately the same vertical movement of the fixed pads 116 as the release bars 150 lifting the barrier bars 110 sufficiently above the surfaces of the conveyor link chains 40 so that one or more of the product 140 is supported thereon out of contact with the chains and barred from movement thereon. The angular dimension of the generally circular cam lift surface 160 of the drive cam 90 is about 90° and the lowered cam surface 182 is about three-fourths of the angular circumference of the cam 90, in the embodiment shown, for purposes of illustration. From this description it is apparent that the rotation of the cam 90 raises the release assembly 102 from the lowered release position shown in broken lines in FIG. 3 to the "stop position" shown in FIG. 2 and at the same time the barrier carriage assembly 100 oscillates oppositely from the lifted bar position shown in broken lines in FIG. 3 to the lowered position in FIG. 2. This action moves the upright release bars 150 from above the chains 40 as shown in FIG. 2 in a position to stop the product to the lowered (broken line) position shown in FIG. 3 for release of product, and at the same time mvoes the barrier pads 130 to the raised (broken line) position shown in FIG. 3 from the lowered position of FIG. 2 for purposes to be described.

Since the drive cam 90 is rotating constantly when the inlet conveyor 12 is in operation, the cam follower 158 would normally be in constant contact with the drive cam 90 and the barrier carriage assembly 100 and the release assembly 102 would thus also oscillate continuously. In accordance with this invention means are provided to control the movements of the escapement mechanism 14 so that the escapement remains in the position shown in the broken lines in FIG. 3 until three conditions are satisfied: 1) the switch 80 is open, 2) the release assembly 102 is in the lowered or release position or conversely the barrier carriage assembly 100 is in the complete raised (broken line) position (FIG. 3), and 3) the re-energized time delay relay 212 has opened the by-pass circuit 213. Only when these three conditions are satisfied does the escapement device start to cycle at a constant speed of 50 operations per minute. The invention includes means to accomplish this type of control and to incorporate the time delay in the operation of the control sufficient to take into account any spacing between incoming product and to assure that the original product build-up is maintained so that the escapement 14 operates continuously and the operation of the control means is intermittent or only when needed, with the obvious advantage of saving wear on the control parts.

Accordingly, a latch arrangement is provided, with a predetermined time delay so that in the event one or the other of the conditions aforementioned is not satisfied the escapement is locked into the broken line position shown in FIG. 3. The cross member 154 is provided with a horizontal catch bar 184 on its under side held by suitable support members 186 (FIGS. 2, 3 and 4). Another part of the frame member 187 in FIG. 2 holds the latch member 188, pivotally mounted on latch pin 190. The latch member 188 has a tab 192 which is engageable over the catch bar 184 in the extended position and disengages therefrom in a retracted position as it pivots on the pin 190. In product build-up control assembly 193 shown in FIG. 2, trunion bracket 194 pivotally supports the cylinder end of the two-way air cylinder 196 on the pin 198. The rod end 200 of the air cylinder 196 is pivotally mounted to the latch member 188 through a clevis member and a second pin 204. The frame member 187 also supports the pilot air valve 206 so that its actuating arm 208 and roller are in the plane of and contacted by the edge of the latch member 188. The pilot valve 206 is mechanically actuated like the Humphrey No. 125 MC-e-10-21-31 which is normally closed when the latch member 188 is disengaged from tab 192 as shown in FIG. 2. Pilot valve 206 is opened when the latch member 188 is disengaged from tab 192 as shown in FIG. 2. Pilot valve 206 is opened when the latch member 188 is engaged with the tab 192 holding the catch bar 184 down so that the support bars 144 and the cam follower 158 are maintained in the lowermost broken line position shown in FIG. 3, against the bias of the spring 162. In this position with latch member 188 engaged with tab 192, the cam follower 158 just touches the cam lift surface 160 of the rotating cam 90, which action depresses the cam follower and the support bars 144 an amount (about 1/64 inch) sufficient to allow the latch member 188 to freely disengage.

A system of electrical and pilot-operated pneumatic controls is provided to accomplish the timing delay to allow for optimum product build-up for continuous operation and synchronization of latch disengagement for optimum start-up. Electrical power supply 210 in FIG. 2 is series connected to the product switch 81 through the coil of the timing delay device 212. In the same circuit lead 213 by-passes product switch 81 and connects with the make-break circuit of the timing delay device 212. Micro-switch 214 (normally open) is supported by the frame 24 in such a manner that its actuating arm 216 is in contact with the bracket 154 so as to switch 214 closed when bracket 154 is in the full down position. The series circuit then connects to the electrically-operated pilot valve 218 (normally closed) and back to the supply to complete the circuit.

The source of pneumatic power 220 passes through a suitable filter regulator and oiler 222, and into the pilot valve 218 via the pilot line 224 controlling one source of pneumatic power for the air cylinder 196. The pilot line 226 connects from the pilot valve 218 to the directional control valve 228, having the pneumatic power line 230 for extending the rod end 200 and the pneumatic power line 232 for retracting rod end 200 connected to the air cylinder 196 controlling its other source. The pilot valve 206 derives its air supply by means of the pilot line 234 from source 220 and is connected to the directional control valve 228 via the pilot line 236. Pilot air pressure in line 236 is also controlled by a synchronizing pilot valve 238 (normally closed), which is actuated by the synchronizing cam 240. The angular dimension of the cam lift surface of the cam 240 is about 5°. The synchronizing cam 240 is actuated once per revolution by drive cam 90 rotatably mounted on drive shaft 94.

The time delay device must have time delay sufficient to lock out escapement 14 until the predetermined product on inlet conveyor 12 builds up over product switch arm 80. At the end of the delay period, if the predetermined build-up has been attained, the make-break therein opens and the circuit is broken. The switch then returns to its original position. Re-energization of the unit at or before the end of the delay period immediately recycles the unit, readying it for another delay period. A timing relay of this type is illustrated by the product known as the Agastat Model 2422 Ad of the double-pole, double-throw type with delay on drop-out and a time range adjustable from about 2.5 to 50 seconds. The microswitch 214 can be of the type BZE6-2RQ2 (normally open) as manufactured by MICRO of Freeport, Illinois, equipped with a sealed roller arm. The directional control valve 228 can be air operated, pilot pneumatic control as illustrated by the Mead Model M double-pressure, bleed-piloted valves, with speed control. The pilot valve 218 can be the same type as the valve 206, only electrically operated, i.e., by the switches 212, 214 and 81 in its circuit. The synchronizing air valve 238 can be of the same type as the valve 206.

The operation of the device is illustrated by reference to the drawings as so far described and also in relation to the FIGS. 5-16 as follows:

With the drive means engaged and the conveyor system operating, but with no product on the in-feed roller 34, the product switch arm 80 is in raised position and the product switch 81 is closed. Assuming that the parts are in the position shown in FIG. 2, as the drive cam 90 rotates clock-wise, it carries the release assembly 102 downward and the barrier carriage assembly 100 upward and at the low point of the cam cycle, the micro-switch 214 is closed. About 45° later in the cycle, the synchronizing cam 240 opens the air valve 238. The latch tab 192 is in open position and the air valve 206 is closed. Air pressure is maintained in line 232 holding the latch open. However, the closing of the switch 81 and the microswitch 214 actuates or opens the valve 218, reversing the directional control valve 228 and the pressure in line 232 is released while at the same time the air pressure is switched to the line 230 and before the drive cam 90 is disengaged from cam follower 158, the latch moves to closed position holding the barrier carrier in the broken line position of FIG. 3. Each successive revolution of the drive cam 90 lowers the catch bar 184 sufficient to latch but, since the switch 81 remains closed and the air valve 206 has been closed by the latch, the successive openings of synchronizing valve 238 do not switch the directional control valve 228. This is the condition shown in FIG. 5.

As soon as the switch 81 is opened by hand or by the presence of product on the switch arm 80, the circuit to the coil of the timer 212 is broken and the time delay begins. This is the condition in FIG. 6 and if only one product enters the escapement, the switch 81 is allowed to close again and the timer returns to the position for a full time delay period. Product No. 2 again de-energizes the timer (FIG. 7) while product No. 1 has been retained by the barrier carriage and no longer moves with the conveyor. When product No. 2 moves against product No. 1 (FIG. 8) and is likewise retained, the switch 81 is still held open and if the timing device 212 reaches the end of the delay period as by product No. 3 entering upon the switch arm 80, the timing device 212 opens the circuit in the by-pass 213. The same revolution of the drive cam 90 carries the bracket 154 into contact with the switch 214, but since the circuit is open, the valve 218 is closed. At the same time, the synchronizing cam 240 opens the synchronizing valve 238 and since the valve 206 is already held in open position and the pulse of air to the directional control valve 228 through the line 236 causes the valve 228 to direct the air pressure to the line 232 to retract the rod end 200 and unlatch the release assembly 102. The synchronizing cam 240 is so positioned on drive shaft 94 that the pulse of air through the line 236 occurs only when the drive cam 90 is approximately in the center of its 90° engagement with the drive cam follower 158.

Thus, with product No. 3 also holding switch 81 open, the drive cam 90 in cooperation with the tension springs 162 allows the barrier carriage assembly 100 to lower and the release assembly 102 to raise on the next half cycle, the condition in FIG. 9. Products Nos. 1, 2 and 3 continue to be carried by the conveyor chain 40 with the escapement 14 continuing to operate and if product No. 4 in the meantime has not allowed the switch 80 to close, the condition of FIG. 10 ensures just after a cleat 74 on the conveyor 16 has come to the top of the plate 26 with the product No. 1 held by the release carriage 102. On the next rotation of the drive cam 90, products Nos. 2 and 3 are still over the barrier carriage 100 and are raised thereby (FIG. 11) at the same time product No. 1 is released to be engaged by the next succeeding cleat 74 and carried in timed sequence to the processing machine. The cycle continues with product No. 5 holding the switch 80 open, while product No. 2 moves against the release carriage (FIG. 12). The temporary absence of product No. 5 on switch 80 or the momentary release of the switch 80 to closed position less than the delay period of timing device 212 continues this cycle of events delivering product to the escapement and products Nos. 2 and 3 are released.

If product No. 6 is spaced from product No. 5 (FIGS. 14 and 15), such that the switch 80 remains closed longer than the delay period of timing device 212, the next cycle of the release assembly 102 to down position closes switch 214 and opens the valve 218. This causes the air cylinder 196 to move in the reverse or latch position and hold the barrier carriage assembly 100 up with the release assembly 102 down, the condition of FIG. 6. This condition prevails until product build-up is again established as in FIG. 16. When the release assembly 102 is in the latched or down position and there is no product on the switch 80, there is no pulse of air from the circuit 236 to the direction control valve 228 with each revolution of the synchronizing cam 240. Thus directional control valve 228 is not changed in position as long as the valve 218 is held open by the completed circuit 210 through closed product switch 81 or through by-pass 213 before the delay period of timing device 212 has expired because a change in directional control by valve 228 cannot occur when the line 226 is maintained under pressure.

To start the device feeding, in actual practice, at the beginning of a run, the operator may place two or three packages on the barrier carriage assembly 100 and then manually hold the product flow back for a few moments until a suitable product buildup has occured. This is the condition shown in FIGS. 9–16. From this point on, the escapement operates automatically until the end of the run, at which point it is only necessary to hold down the switch arm 80 manually until the last two or three packages have been discharged.

The U-bar pads 116 are preferably fixed to the ends of adjustable U-shaped flat topped bars 115 while the adjustable pads 130 are adjustable longitudinally of the escapement on the top of said bars 115. The pads 116 are positioned in relation to the pads 130 so that the former came up under the product or package as product No. 2 in FIGS. 10 and 11, slightly back of the leading edge and the latter came up just ahead of the rear edge of the same package. In other words, the longitudinal distance between the pads 116 and 130 is less than the width of the package at the bottom. The delay period of the timing device 212 is adjustable to accommodate any desired build-up of products on the inlet conveyor 12 of the machine and is adjustable while the machine is in operation to produce uniform product flow to the processing machine. The rate of product output by the escapement is the same as the rate of product input to the processing machine. The rate of product output which equals the product input of the processing machine must be at least 10 percent greater than the rate of production of product at the source otherwise the products would jam up. Short delays like that interposed by timing device 212 to allow production to catch up are normal and expected.

Referring to FIGS. 17, 18 and 19, a modification of the escapement of this invention is shown wherein the side frame members 24 support the fixed journals 250 from which the pair of spaced lever arms 252 are pivotally mounted on a transverse shaft 254. The lever arms 252 carry the upright members 256 between the ends of which the barrier roller 260 is rotatably mounted on the shaft 262.

A second pair of fixed journals 264 is carried within the framework, supporting the transverse shaft 266 from which the pair of lever arms 268 is pivotally mounted and have the spaced upright members 270 between the ends of which the shaft 272 carries the rotatable release roller 274. The lever arm 268 is longer than the lever arm 252 and the fixed journal 276 is mounted between the spaced uprights 256 and 270, holding the rocker arm 278 on the shaft 280. The upright member 256 is joined to the end of the rocker arm 278 by means of the link 282 and the pins 284 and 286. The upright member 270 is joined to the other end of the rocker arm 278 by means of the link 288 and the pins 290 and 292. The link 282 extends upwardly from the end of the rocker arm 278 while the link 288 depends downwardly from the opposite end of the rocker arm. The lever arm 268 carries the drive cam follower 158' at about its midpoint. By these means the operation of the drive cam 90 (not shown) against the cam follower 158' moves the barrier roller 260 in an arc which has a shorter radius than the arc of movement of the release roller 274, so that the distance between the rollers widens in their respective position. In effect the release roller 274 moves away from its raised position over the level of the conveyor chain 40 in the direction of travel of the chain while the barrier roller 260 moves in a more perpendicular path.

Although this invention has been described in relation to specific embodiments illustrated in the drawings, it is not be so limited and a number of modifications become apparent to one skilled in the art that are still within the scope of the invention. The escapement 14 can be constructed to accommodate wide or narrow conveyor systems, and may be used in tandem or series and the spacing between the barrier and release means can be varied to accommodate different size packages or items being conveyed. The drive cam 90 can be any means for providing an oscillating motion to the parts and can be caused to actuate the escapement through any of the movable parts thereof. Thus, the drive cam 90 can operate by a lifting action instead of a down thrust and the springs 162 can be reversed, or the drive cam 90 can operate on the opposite side of the shaft 146, i.e., upon the extendion of the pivot lever 144.

As illustrated in FIGS. 17, 18 and 19, the pivotal or oscillating action imparted through the rocker arms 166 and 278 can be off-center or through the use of different length of links, i.e., 282 and 288 or 170 and 172 of FIG. 3. The barrier carriage can be made to lift vertically instead of being pivotally mounted. The drive cam 90 can be constructed to rotate 180° in one direction and then reverse. Also the control system can be varied from the compressed air and electrical circuit shown and other time delay means 212 can be used, as would be apparent to one skilled in the art. Thus, instead of using a delay on drop-out type of time delay means 212, the delay on pull-in type can be used. The operation of the various switches can be reversed, that is, the switch 80 can be normally open and be closed by incoming product, and the timing delay can provide a delay period on energization. The directional control valve 228 is pilot operated of the type illustrated by the Mead Model M. Other types of directional control valves can be used. Although the micro-switch 214 is preferably of the sealed roller arm type, it is also apparent that other forms of micro-switches can be used. The latch member 188 can be of the sliding bolt type rather than a pivot lever. Several of the pivot points can be made adjustable in the arrangement shown so as to alter the stop and release timing cycles.

Although several specific embodiments of this invention have been herein shown and described, it will be understood that the details of construction and operation shown can be altered or omitted without departing from the spirit of the invention.

We claim:

1. A package handling machine comprising a frame having side frame members and an inlet at one end adapted to receive product delivered thereto at a random rate, and means for discharging said product in timed and spaced relationship at the discharge end of the machine, suitably indexed with respect to the infeed requirements of a subsequent processing machine, comprising:
   a. a slider bed conveyor means operationally mounted on the side frame members for discharging product from said machine;
   b. an escapement means operationally mounted on the side frame members adapted to deliver uniformly timed and spaced product to the discharge slider bed conveyor;
   c. a product inlet conveyor means mounted on the side frame members at the inlet end of the machine for receiving product in random input relation and for delivering product to the product escapement means;
   d. a drive means mounted on the side frame members for driving the product inlet conveyor, the escapement means and the slider bed conveyor means in timed relation with each other;
   e. latch means mounted on the side frame members operationally connected to the escapement means for stopping release of product to the discharge slider bed conveyor means;
   f. product switch means mounted on said inlet conveyor means adjacent the inlet end of the machine to detect the lack of sufficient product on said inlet conveyor means to maintain the continuous discharge of product by said slider bed conveyor in timed and spaced relationship with the input requirements of a subsequent processing machine;
   g. latch actuating means mounted on said side frame members operationally connected to the product switch means and to said latch means for disengaging said latch means from the escapement means; and
   h. time delay means operationally connected to said product switch means and to said latch actuating means for delaying the disengagement of said latch means from the escapement means until a predetermined build-up of said product is present on said inlet conveyor means.

2. A package handling machine as in claim 1 wherein the latch actuating means comprises:
   a. a two-way air cylinder trunion mounted on the side frame members operationally connected to the latch means for extending to engage and retracting to disengage said latch with the escapement means;
   b. a directional control air valve operationally connected to the air cylinder for extension and retraction thereof;
   c. an electrically operated pilot valve operationally connected to the directional control air valve for extension of said air cylinder;
   d. a microswitch mounted on the side frame members operationally connected to the pilot valve, to the release bars of the escapement means and to the time delay means and to the product switch means;
   e. a synchronizing cam mounted on the drive shaft;
   f. a synchronizing pilot valve operationally connected to the directional control air valve for retraction of said air cylinder and to the synchronizing cam; and
   g. a mechanically operated pilot valve operationally connected to the synchronizing valve and the latch means.

3. A package handling device having side frame members and adapted to receive product delivered to its inlet end at a random rate, and for discharging said product from its discharge end in timed and spaced relationship, suitably indexed with respect to the infeed requirements of a subsequent processing machine, comprising:
   a. a slider bed conveyor mounted on the side frame members for discharging product from said device in said timed and spaced relation;
   b. a continuous conveyor flight mounted on the side frame members operationally connected to said inlet end of the device and to a receiving end of the slider bed conveyor at the discharge end of the device;
   c. a barrier carriage assembly mounted on the side frame members including a barrier bar adapted to be lifted to a position above the continuous conveyor flight intermediate the inlet end of the device and the receiving end of the slider bed conveyor, for lifting products off said continuous conveyor flight;
   d. said barrier carriage assembly having a stop means for stopping products on said barrier carriage assembly against movement along said continuous conveyor flight when the barrier bar is in the lifted position;
   e. a release carriage assembly mounted on the side frame members including spaced upright release bars adapted to be raised above the continuous conveyor flight to a position in the path of the product adjacent the receiving end of the slider bed conveyor to stop said product on said continuous conveyor flight, and adapted to be lowered from said position in the path of the product for release of said product onto said slider bed conveyor;
   f. rocker arm means mounted on the side frame members operationally linked to said barrier carriage assembly and to said release carriage assembly to simultaneously lift said barrier bar and to lower said release bars in timed opposite oscillation;
   g. spaced flight means operationally connected to said slider bed conveyor to discharge product in said timed and spaced relationship from the device;
   h. cam follower means mounted on said release carriage assembly;
   i. drive cam means mounted on the side frame members, operationally connected to the cam follower means, driven in timed relationship with said spaced flight means to raise and lower said release carriage assembly in timed and spaced relationship with said spaced flight means;
   j. latch means mounted on said side frame members operationally connected to engage said release carriage assembly in its lowered position;
   k. product switch means mounted on said continuous conveyor flight at inlet end of device to detect the lack of a predetermined build-up of said product on said continuous conveyor flight at the inlet end of the device;

l. synchronizing means mounted on said side frame members for effecting latch means disengagement when the cam follower means is in synchronized contact with the drive cam means; and m. latch actuating means mounted on said side frame members operationally connected to said product switch means and said synchronizing means for disengaging said latch means from said release carriage assembly when a predetermined build-up of said product is on said continuous conveyor flight at the inlet end of the device, and the cam follower means and the drive cam means are in synchronized contact.

4. A package handling device in according with claim 3 including time delay means operationally connected to said product switch means to delay the operation of said latch actuating means for a period of time to allow a predetermined build-up of said product on said continuous conveyor flight at the inlet end of the device.

5. A package handling device in accordance with claim 4 in which:

a. said barrier carriage assembly comprises pad means slidably mounted on said spaced pivot bar and barrier bar assembly adjustably affixed thereon for stopping the product on said barrier carriage assembly, said pivot bar pivotally mounted on the side frame members and adapted to lift said barrier bar and pad means above the continuous conveyor flight intermediate of the inlet end of the device and the receiving end of the slider bed conveyor at the discharge end of the device to lift product off said continuous conveyor flight;

b. said release carriage assembly comprises spaced upright release bars affixed to the end of spaced support bars pivotally mounted on the side frame members adapted to be operationally raised above the continuous conveyor flight adjacent the receiving end of the slider bed conveyor and adapted to be lowered from a position in the path of the product for release of said product onto said slider bed conveyor.

6. A package handling device comprising a frame having side frame members and an inlet at one end adapted to receive product delivered thereto at a random rate, and for discharging said product in timed and spaced relationship at the end opposite said inlet, suitably indexed with respect to the infeed requirements of a subsequent processing machine, comprising:

a. a slider bed conveyor mounted on the side frame members for discharging product from said device in said timed and spaced relation;

b. a continuous conveyor flight mounted on the side frame members operationally connected to the inlet end of the device and to the receiving end of the slider bed conveyor at the discharge end of the device;

c. a barrier carriage assembly mounted on the side frame members having stop means for stopping products on said barrier carriage assembly against movement along said continuous conveyor flight;

d. a release carriage assembly mounted on the frame adjacent the slider bed conveyor and having release means for release of said product onto said slider bed conveyor;

e. rocker arm means mounted on the frame and operationally linked to said barrier carriage assembly and to said release carriage assembly to simultaneously lift said stop means and to lower said release means;

f. spaced flight means operationally connected to said slider bed conveyor to move the product there-along and discharge product in timed and spaced relationship from the device;

g. cam follower means connected with said release carriage assembly;

h. drive cam means mounted on the said frame operationally connected to the cam follower means, driven in timed relationship with said spaced flight means to raise and lower said release carriage assembly in timed relationship with the travel of said spaced flight means;

i. latch means mounted on said frame operationally connected to engage said release carriage assembly in its lowered position;

j. product switch means mounted adjacent said continuous conveyor flight adjacent the inlet end of device to detect the lack of a predetermined build-up of said product on said continuous conveyor flight; and k. latch actuating means mounted on said frame operationally connected to said product switch means for disengaging said latch means from said release carriage assembly when a predetermined build-up of said product is present on said continuous conveyor flight.

7. A package handling device, having side frame members and adapted to receive product delivered to its inlet end at a random rate, and for discharging said product in timed and spaced relationship, suitably indexed with respect to the infeed requirements of a subsequent processing machine, comprising:

a. a slider bed conveyor mounted on the side frame members for discharging product from said device in said timed and spaced relation;

b. a continuous conveyor flight mounted on the side frame members operationally connected to said inlet end of the device and to the receiving end of the slider bed conveyor at the discharge end of the device;

c. a barrier carriage assembly mounted on the side frame members including a barrier bar adapted to be lifted above the continuous conveyor flight intermediate the inlet end of the device and the receiving end of the slider bed conveyor for lifting products off said continuous conveyor flight;

d. said barrier carriage assembly having a stop means for stopping products on said barrier carriage assembly against movement along said continuous conveyor flight when the barrier bar is in the lifted position;

e. a release carriage assembly mounted on the side frame members including spaced upright release bars adapted to be raised above the continuous conveyor flight adjacent the receiving end of the slider bed conveyor to a position in the path of the product and to stop said product on said continuous conveyor flight, and adapted to be lowered from said position in the path of the product for release of said product onto said slider bed conveyor;

f. rocker arm means mounted on the side frame members operationally linked to said barrier carriage assembly and to said release carriage assembly to simultaneously lift said barrier bar and to lower said release bars;
g. spaced flight means operationally connected to said slider bed conveyor to discharge product in said timed and spaced relationship from the device;
h. cam follower means mounted on said release carriage assembly;
i. drive cam means mounted on the side frame members, operationally connected to the cam follower means, driven in timed relationship with said spaced flight means to raise and lower said release carriage assembly in timed and spaced relationship with said spaced flight means;
j. latch means mounted on said side frame members operationally connected to engage said release carriage assembly in its lowered position;
k. product switch means mounted on said continuous conveyor flight at inlet end of device to detect the lack of a predetermined build-up of said product on said continuous conveyor flight at the inlet end of the device; and
l. latch actuating means mounted on said side frame members operationally connected to said product switch means for disengaging said latch means from said release carriage assembly when a predetermined build-up of said product is on said continuous conveyor flight at the inlet end of the device.

* * * * *